(12) United States Patent
Sone et al.

(10) Patent No.: US 10,922,509 B2
(45) Date of Patent: Feb. 16, 2021

(54) LABEL READING SYSTEM

(71) Applicant: TOYOTA JIDOSHA KABUSHIKI KAISHA, Toyota (JP)

(72) Inventors: Daiji Sone, Toyota (JP); Katsuhiko Nagasawa, Aichi-ken (JP); Keizo Fukushima, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/541,613

(22) Filed: Aug. 15, 2019

(65) Prior Publication Data

US 2020/0065538 A1 Feb. 27, 2020

(30) Foreign Application Priority Data

Aug. 22, 2018 (JP) ................................ 2018-155637

(51) Int. Cl.
*G06K 7/10* (2006.01)
*G06K 7/14* (2006.01)
*G06K 13/24* (2006.01)

(52) U.S. Cl.
CPC ......... *G06K 7/1417* (2013.01); *G06K 7/1413* (2013.01); *G06K 13/24* (2013.01)

(58) Field of Classification Search
CPC ........... G06K 7/10861; G06K 7/10851; G06K 7/10871

USPC ......................................... 235/462.14, 462.1
See application file for complete search history.

(56) References Cited

U.S. PATENT DOCUMENTS

| 5,542,490 A | * | 8/1996 | Kemshall | ................. | B62D 5/07 |
| | | | | | 180/422 |
| 6,150,938 A | * | 11/2000 | Sower | ................... | B66F 9/0755 |
| | | | | | 250/491.1 |
| 7,757,946 B2 | * | 7/2010 | Kienzle-Lietl | ........... | G01G 9/00 |
| | | | | | 235/383 |
| 2006/0092014 A1 | * | 5/2006 | Onderko | ............ | G06K 7/10336 |
| | | | | | 340/539.13 |
| 2016/0009177 A1 | * | 1/2016 | Brooks | ................ | B65G 69/006 |
| | | | | | 340/468 |
| 2017/0369288 A1 | * | 12/2017 | Fulton | .................... | B25J 9/1676 |

FOREIGN PATENT DOCUMENTS

| JP | 2009-155108 A | 7/2009 |
| JP | 2014-131935 A | 7/2014 |
| JP | 2018-016489 A | 2/2018 |

\* cited by examiner

*Primary Examiner* — Ahshik Kim
(74) *Attorney, Agent, or Firm* — Sughrue Mion, PLLC

(57) ABSTRACT

A label reading system that reads labels attached to packages placed on a conveyor vehicle while the conveyor vehicle passes through a label reading area includes a guide device that guides the conveyor vehicle toward the label reading area, by indicating a traveling speed and a traveling position set in advance so as to enable reading of the labels, and an information reading device that takes images of the labels in the label reading area, and reads information on the labels.

13 Claims, 8 Drawing Sheets

LABEL READING SYSTEM

INCORPORATION BY REFERENCE

The disclosure of Japanese Patent Application No. 2018-155637 filed on Aug. 22, 2018 including the specification, drawings and abstract is incorporated herein by reference in its entirety.

BACKGROUND

1. Technical Field

The disclosure relates to a label reading system. In particular, the disclosure is concerned with a system for reading labels attached to packages conveyed by a conveyor vehicle.

2. Description of Related Art

When a plurality of packages (e.g., parts boxes containing parts) is delivered to a plant (e.g., an automobile production plant), each of the packages is provided with a label in which the type, number, etc. of the parts contained in the package are written. For example, a two-dimensional code, such as a bar code or a QR code (registered trademark), is drawn on the label. When the packages are delivered, the above-indicated information is obtained by reading the two-dimensional code with a scanner (e.g., a handy scanner) or a camera, for example, and it is checked whether the parts have been properly delivered. In this manner, missing parts, or the like, can be prevented in advance. In actual checking, an operator generally performs operation to successively read two-dimensional codes on labels attached to respective packages, using a hand scanner.

In the meantime, checking of packages utilizing radio frequency identifier (RFID) tags is disclosed in Japanese Unexamined Patent Application Publication No. 2014-131935 (JP 2014-131935 A). More specifically, a forklift that carries a plurality of packages (parts boxes) to which the RFID tags are attached is caused to pass through a gate on which antennas for readers/writers of the RFID tags are mounted, so that information on the RFID tags attached to the respective packages is read.

SUMMARY

The inventors of this disclosure examined whether the method of reading labels (two-dimensional codes on labels) attached to packages, by use of cameras, or the like, can be implemented by causing a forklift on which the packages are placed to pass through a gate, as in the system of JP 2014-131935 A.

The inventors then found that, in this case, it is necessary to properly obtain the passing speed and passing position of the forklift when passing through the gate on which the cameras, or the like, are mounted, so as to accurately read the labels with the cameras, or the like. Namely, when the passing speed is too high, the labels may not be accurately read. Also, when the passing position in the gate is not properly obtained, the distance between each label and the corresponding camera may be too long or too short. In this case, too, the label may not been accurately read, since the camera is not focused on, for example. No means for properly obtaining the passing speed and passing position has been proposed so far, and whether the passing speed and passing position are properly obtained is dependent on the skill of the operator of the forklift. Namely, it may be difficult to properly obtain the passing speed and passing position, depending on the skill of the operator, and the labels may not be accurately read.

This disclosure provides a label reading system that enables a camera, or the like, to accurately read a label attached to a package conveyed by a conveyor vehicle, such as a forklift.

A label reading system according to one aspect of the disclosure reads a label attached to a surface of a package placed on a conveyor vehicle driven by an operator while the conveyor vehicle passes through a label reading area. The surface of the package extends in a direction parallel to a traveling direction of the conveyor vehicle. The label reading system includes a guide device located on ahead of the conveyor vehicle in the traveling direction and configured to guide the conveyor vehicle toward the label reading area, by indicating a traveling speed of the conveyor vehicle, and a traveling position of the conveyor vehicle in a horizontal direction perpendicular to the traveling direction. The traveling speed and the traveling position are set in advance so as to enable reading of the label. The label reading system also includes an information reading device configured to take an image of the label in a direction perpendicular to the traveling direction of the conveyor vehicle in the label reading area, and read information on the label.

According to the above aspect, the guide device located on ahead of the conveyor vehicle in the traveling direction guides the conveyor vehicle on which the package is placed, toward the label reading area, by indicating the traveling speed and the traveling position in the horizontal direction perpendicular to the traveling direction, which are set in advance so as to enable reading of the label (reading of a two-dimensional code drawn on the label, for example). Accordingly, when the operator of the conveyor vehicle drives the conveyor vehicle at the traveling speed and traveling position according to the guidance of the guide device, it is possible to accurately read information on the label from an image of the label taken by the information reading device in the label reading area. In other words, the operator of the conveyor vehicle is merely required to drive the conveyor vehicle according to the guidance of the guide device (without being required to have a high skill), so that the information on the label can be accurately read from the image of the label taken by the information reading device in the label reading area. Thus, the method of taking the image of the label attached to the package and reading the information on the label is implemented with enhanced practicality, by causing the conveyor vehicle that carries the package to pass through the label reading area.

In the above aspect, the guide device may be configured to radiate guide light onto a road surface on ahead of the conveyor vehicle in the traveling direction, and the guide device may be configured to move a radiation position of the guide light on the road surface toward the label reading area at a preset speed and a preset position, so as to enable the information reading device to read the label when the conveyor vehicle travels, following the guide light.

When guiding the conveyor vehicle on which the package is placed, toward the label reading area, the guide device radiates guide light onto the road surface on ahead of the conveyor vehicle in the traveling direction thereof. Then, the guide light moves on the road surface toward the label reading area, at the preset speed and the preset position. The speed and position of the guide light are set in advance so as to enable the information reading device to read the label when the conveyor vehicle travels following the guide light.

Therefore, when the operator drives the conveyor vehicle such that the vehicle follows the guide light, the information on the label can be accurately read from an image of the label taken by the information reading device in the label reading area. With the above arrangement, no special vehicle is needed for guiding the conveyor vehicle (since the vehicle is guided by the guide light); thus, the conveyor vehicle can be guided toward the label reading area at a low cost.

In the label reading system as described above, an image of the guide light radiated onto the road surface may have a shape that extends between a first end position and a second end position of a traveling range of the conveyor vehicle in the horizontal direction perpendicular to the traveling direction of the conveyor vehicle, so as to define the traveling range that enables reading of the label.

The image of the guide light is used for defining the traveling range of the conveyor vehicle in the horizontal direction perpendicular to the traveling direction of the conveyor vehicle. Therefore, when the operator drives the conveyor vehicle so that the vehicle does not deviate from the range between the first end position and second end position of the image of the guide light, an appropriate distance can be provided between an image pickup device (such as a camera) of the information reading device, and the label, and the information on the label can be accurately read from the image of the label taken by the information reading device in the label reading area.

In the label reading system as described above, the guide device may be installed downstream of the label reading area in a direction parallel to the traveling direction of the conveyor vehicle, and may be configured to radiate the guide light onto the road surface located upstream of the label reading area in the direction parallel to the traveling direction of the conveyor vehicle.

With the above arrangement, in a condition where the conveyor vehicle is travelling on a road upstream of the label reading area, the guide light radiated from the guide device toward the road surface can be prevented from being blocked by the conveyor vehicle. Namely, it is possible to guide the conveyor vehicle toward the label reading area, by appropriately radiating the guide light onto the road surface, until the conveyor vehicle passes through the label reading area. Consequently, the information on the label can be accurately read from the image of the label taken by the information reading device in the label reading area.

In the above aspect, the guide device may be a guide carriage having a guide member that is located at a predetermined height on ahead of the conveyor vehicle in the traveling direction, and the guide carriage may be configured to travel such that the guide member moves toward the label reading area at a preset speed and a preset position, so as to enable the information reading device to read the label when the conveyor vehicle travels, following the guide member.

When the conveyor vehicle that carries the package is guided toward the label reading area, the guide carriage travels such that the guide member moves toward the label reading area at the preset speed and preset position. The speed and position of the guide member are set in advance so as to enable the information reading device to read the label when the conveyor vehicle travels, following the guide member. Therefore, when the operator drives the conveyor vehicle such that the vehicle follows the guide member, the information on the label can be accurately read from the image of the label taken by the information reading device in the label reading area. Also, with the above arrangement, the operator of the conveyor vehicle drives the conveyor vehicle while seeing the guide member of the guide carriage. Namely, the operator drives the conveyor vehicle while seeing the guide member located at a certain height as measured from the road surface. Therefore, the line of sight of the operator can be kept at a high position, and the operator can properly gain a sense of distance from the guide member, thus assuring good operability in operation of the conveyor vehicle.

In the above aspect, two packages arranged in the horizontal direction perpendicular to the traveling direction of the conveyor vehicle may be placed on the conveyor vehicle, and the label may be attached to a vertical face of each of the packages which extends in the direction parallel to the traveling direction of the conveyor vehicle, on an outer side as viewed in the horizontal direction perpendicular to the traveling direction. The information reading device may include a plurality of imaging units configured to take images of the labels attached to the packages, from opposite sides in the horizontal direction perpendicular to the traveling direction.

With this arrangement, each imaging unit takes an image of the label attached to each of the packages arranged in the horizontal direction perpendicular to the traveling direction of the conveyor vehicle, so that information on the label can be read. Namely, information on the labels can be accurately read with respect to all of the packages placed on and conveyed by the conveyor vehicle.

According to this disclosure, the guide device located on ahead of the conveyor vehicle in the traveling direction guides the conveyor vehicle toward the label reading area, by indicating the traveling speed and the traveling position, and the information on the label is read from an image of the label attached to the package, in the label reading area. Therefore, when the operator of the conveyor vehicle drives the conveyor vehicle at the traveling speed and traveling position according to the guidance, the information of the label can be accurately read from the image of the label taken by the information reading device in the label reading area.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Some embodiments of the disclosure will be described based on the drawings. In the embodiments, the disclosure is applied to a system that reads QR codes (registered trademark) on labels attached to a plurality of packages (parts boxes containing parts) delivered, in an automobile production plant.

Figure 4:
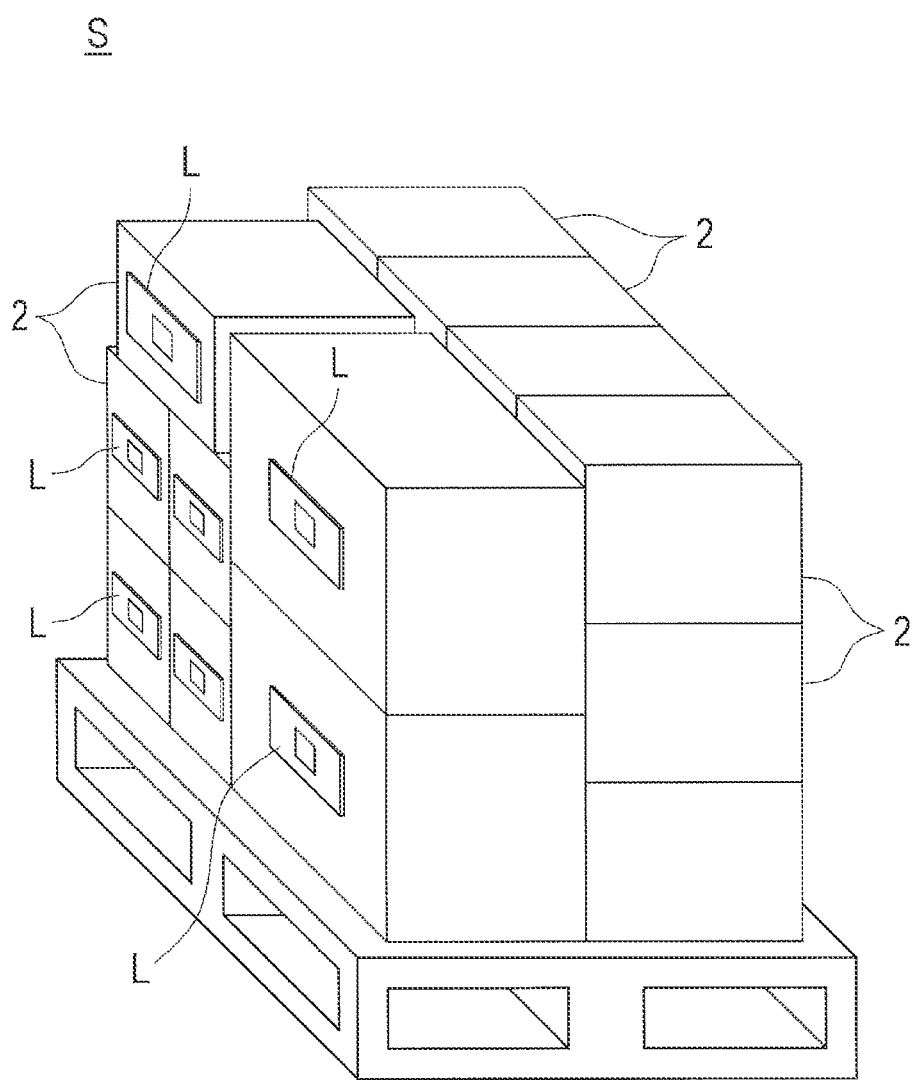
FIG. 4 is a view showing one example of a mounting condition of a plurality of parts boxes on a pallet.

More specifically, parts are delivered by a truck from a supplier or logistics relay station, into the premises of the production plant. The style of packing of the parts thus delivered is in the form of a skid where a plurality of parts boxes containing the parts is placed on a pallet (see FIG. 4). A label reading system according to each of the embodiments is adapted to read QR codes on labels L, L, . . . attached to side faces of a plurality of parts boxes 2, 2, . . . , while conveying the parts boxes 2, 2, . . . in the skid S by use of a forklift 10 (see FIG. 1), so as to read information, such as the type and number of the parts contained in each of the parts boxes 2, 2, . . . , and check if the parts have been properly delivered. Then, the skid S that has been checked is conveyed by the forklift (conveyor vehicle) 10 toward a skid shooter, or the like, installed in the production plant.

First Embodiment

Initially, a first embodiment will be described. A label reading system 1 according to this embodiment is operable to cause a plurality of parts boxes (packages) 2, 2, . . . conveyed by a forklift 10 to pass through a label reading area A, so as to read QR codes on labels L, L, . . . attached to the respective parts boxes 2, 2, . . . .

Configuration of Label Reading System

Figure 1:
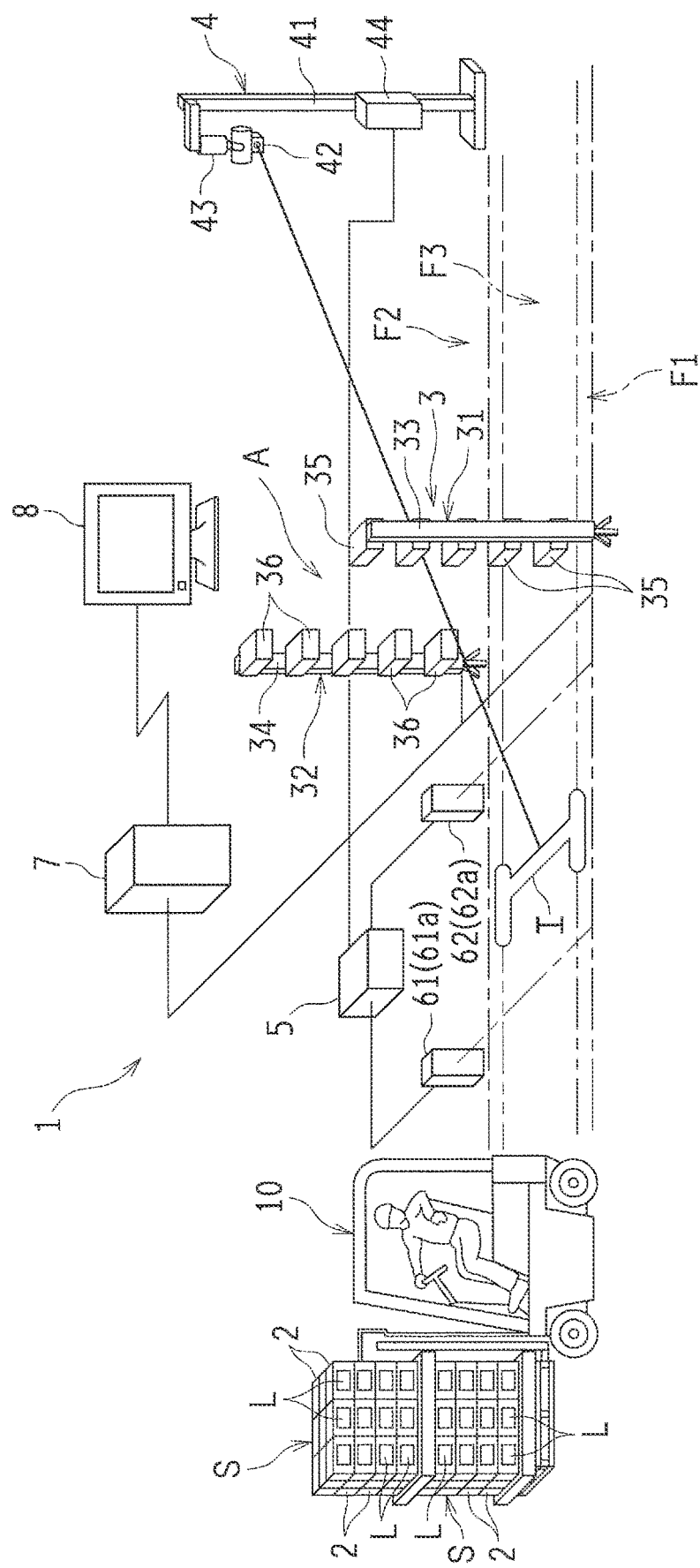
FIG. 1 is a view showing the general configuration of a label reading system according to a first embodiment.

FIG. 1 shows the general configuration of the label reading system 1 according to this embodiment. As shown in FIG. 1, the label reading system 1 includes an imaging device (information reading device) 3 installed in the label reading area A, guide device 4, guide control device 5, first passage sensor 61, second passage sensor 62, information processing terminal 7, monitor device 8, and so forth.

The imaging device 3 includes a pair of imaging units 31, 32 installed with a given spacing provided therebetween. The space between the imaging units 31, 32 is passage space through which the forklift 10 passes, and a floor that includes a floor of the passage space and extends in the lateral direction in FIG. 1 provides a floor (a range of floor on which the forklift 10 can travel) in a traveling pathway F1 (pathway indicated by one-dot chain lines in FIG. 1) of the forklift 10. Accordingly, the dimension of the spacing between the imaging units 31, 32 is set to be larger than the widths of the forklift 10 and the skids S (as measured in a horizontal direction perpendicular to a direction in which the traveling pathway F1 of the forklift 10 extends). Here, one of the imaging units located on the right-hand side (the front side in FIG. 1) when viewing toward the downstream side (the right-hand side in FIG. 1) in the traveling direction of the forklift 10 will be called "first imaging unit 31", and the other imaging unit located on the left-hand side (the back side in FIG. 1) will be called "second imaging unit 32".

The imaging units 31, 32 include support posts 33, 34 erected on floors (floors on the opposite sides of the traveling pathway F1 of the forklift 10) F2, and cameras (image pickup devices) 35, 35, . . . , 36, 36, . . . mounted at equal intervals at a plurality of locations (five locations in this embodiment) of each support post 33, 34 as viewed in the vertical direction. The cameras 35, 35, . . . , 36, 36, . . . are arranged to take images of the inside of the traveling pathway F1 of the forklift 10, and each of the cameras 35, 35, . . . , 36, 36, . . . is adapted to take an image of a given range in the vertical direction. Information of the image taken by each camera 35, 35, . . . , 36, 36, . . . is transmitted to the information processing terminal 7.

The number of the cameras 35, 35, . . . , 36, 36, . . . is set according to the height of the skids S passing through the label reading area A, so that the cameras 35, 35, . . . , 36, 36, . . . can take images of the labels L, L, . . . of all of the parts boxes (all of the parts boxes arranged in the height direction) 2, 2, . . . in the skids S. In this embodiment, for example, the skids S, S, which are stacked in a two-tiered form, pass through the label reading area A as shown in FIG. 1; therefore, the number of the cameras 35, 35, . . . , 36, 36, . . . installed is determined so as to make it possible to take images of the labels L, L, . . . of all of the parts boxes (all parts boxes in the height direction) 2, 2, . . . in the skids S, S.

Figure 2:
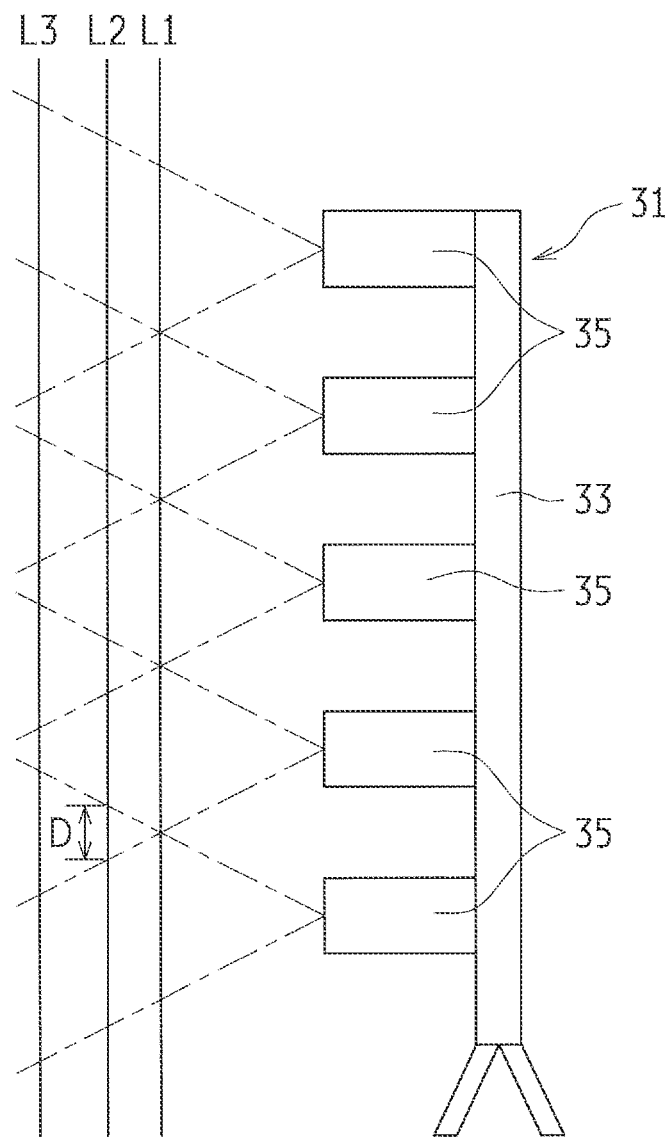
FIG. 2 is a view illustrating an imaging range of each camera in the vertical direction in one of imaging units.

Referring to FIG. 2, an imaging range of each of the cameras 35, 35, . . . on one of the imaging units (first imaging unit) 31 as viewed in the vertical direction will be described. As shown in FIG. 2, each of the cameras 35, 35, . . . has a predetermined view angle in the vertical direction. Namely, the imaging range (see ranges indicated by one-dot chain lines in FIG. 2) is expanded as a distance from the camera 35 increases. Thus, the imaging ranges of the respective cameras 35, 35, . . . do not overlap each other at the right-hand side (close to the camera 35) of position L1 in FIG. 2, whereas the imaging ranges of the cameras 35, 35, . . . overlap each other at the left-hand side (remote from the camera 35) of the position L1. At position L2 in FIG. 2, the overlapping height (overlapping range) of the imaging ranges of the cameras 35, 35, . . . is substantially equal to the height D of the QR code. Namely, if the label L passes through the label reading area A on the left-hand side of the position L2, the whole (in the height direction) of the QR code can be imaged by a single camera 35. Also, position L3 in FIG. 2 is a limit position at which each camera 35 comes into focus (namely, the camera 35 does not come into focus on the left-hand side of the position L3). The other imaging unit (second imaging unit) 32 is configured similarly.

The guide device 4 is installed outside the traveling pathway F1 of the forklift 10 (on the floor F2), downstream (on the right-hand side in FIG. 1) of the label reading area A in a direction parallel to the traveling direction of the forklift 10. The guide device 4 is operable to radiate a laser beam toward the floor in the traveling pathway F1. The laser beam is radiated so as to indicate the traveling speed and traveling position of the forklift 10 on the traveling pathway F1. The specific moving speed and radiation position of the laser beam will be described later.

Figure 3:
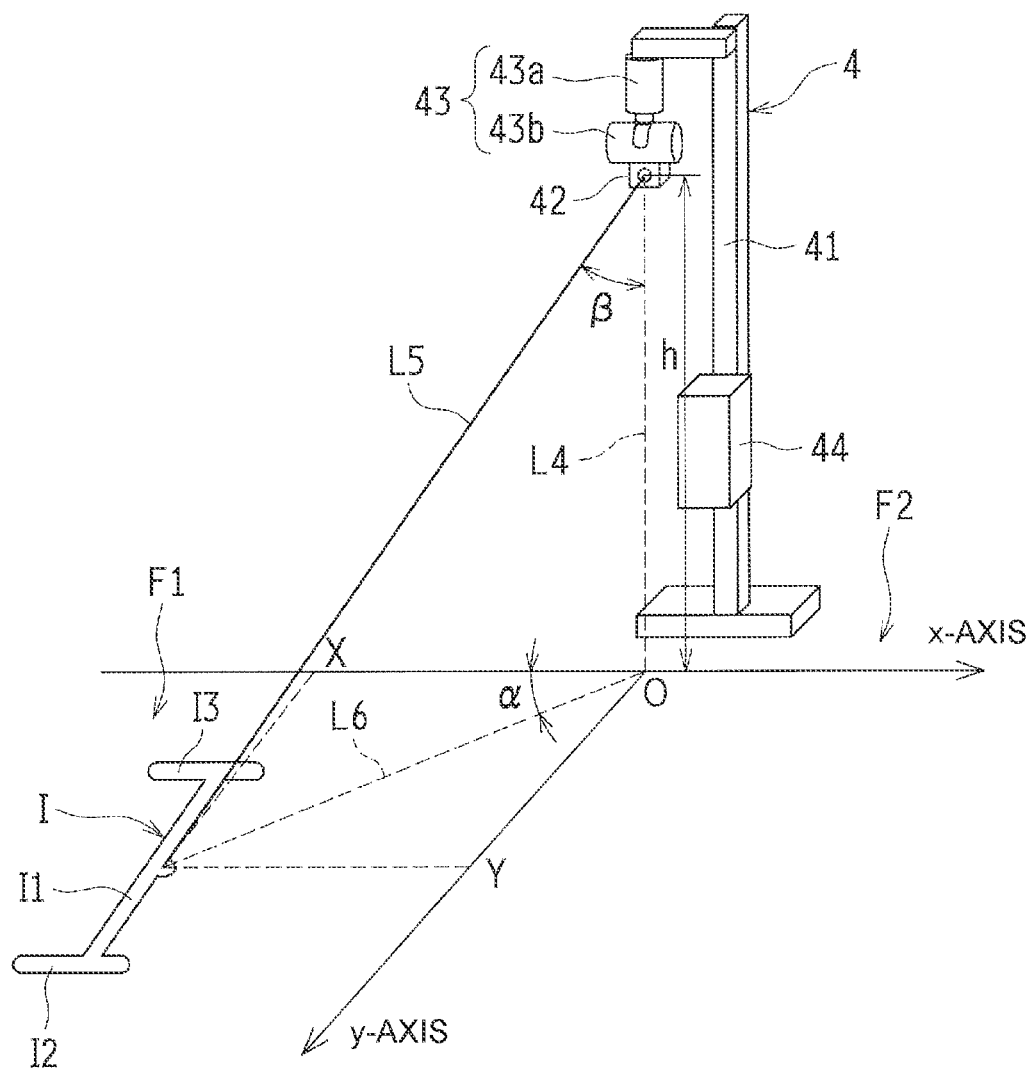
FIG. 3 is a perspective view illustrating a laser beam radiated from a laser radiating unit of a guide device toward a floor of a traveling pathway, in the first embodiment.

As shown in FIG. 3, the guide device 4 includes a laser radiating unit 42 and a laser directing unit 43 in the upper part of the support post 41, and includes a controller 44 in the vicinity of the lower part of the support post 41.

The laser radiating unit 42 contains a laser oscillator, and radiates a laser beam toward the floor of the traveling pathway F1, thereby to draw an image I of laser beam having a given shape, on the floor. More specifically, the image I of laser beam is a generally H-shaped image, and consists of a first straight-line image I1, a second straight-line image I2, and a third straight-line image I3. The first straight-line image I1 has a predetermined length in the width direction of the traveling pathway F1 (i.e., a direction perpendicular to the direction in which the traveling pathway F1 extends). The second straight-line image I2 adjoins one end of the first straight-line image I1 as viewed in the direction of extension of the image I1 (i.e., one end on the front side in FIG. 3), and has a predetermined length along the direction of extension of the traveling pathway F1. The third straight-line image I3 adjoins the other end of the first straight-line image I1 as viewed in the direction of extension of the image I1 (i.e., the other end on the back side in FIG. 3), and has a predetermined length along the direction of extension of the traveling pathway F1.

The length of the first straight-line image I1 (i.e., the length as measured in the direction perpendicular to the direction of extension of the traveling pathway F1) is substantially equal to the width of the forklift 10. The length of each of the second straight-line image I2 and the third straight-line image I3 (i.e., the length as measured in the direction parallel to the direction of extension of the traveling pathway F1) is shorter than the length of the first straight-line image I1 (i.e., the length as measured in the direction perpendicular to the direction of extension of the traveling pathway F1).

The laser directing unit 43 is operable to continuously change the direction of radiation of the laser beam radiated from the laser radiating unit 42, so as to scan the floor of the traveling pathway F1 with the laser beam. More specifically, the laser directing unit 43 has a vertical-axis rotating unit 43a that rotates the laser radiating unit 42 about the vertical axis, and a horizontal-axis rotating unit 43b that rotates the laser radiating unit 42 about the horizontal axis. The rotating units 43a, 43b receive power of electric motors (not shown), thereby to be able to rotate about each axis. With the laser radiating unit 42 thus rotated about the vertical axis and the horizontal axis, the laser beam radiated from the laser radiating unit 42 is caused to travel along the traveling pathway F1. Through traveling of the laser beam, the image I of laser beam drawn on the floor of the traveling pathway F1 can move along the floor.

The position of the image I of laser beam drawn on the floor of the traveling pathway F1 will be described. The laser-beam image I needs to be centrally positioned in the width direction of the traveling pathway F1. To this end, the center position of the first straight-line image I1 of the laser-beam image I needs to substantially match the center position of the traveling pathway F1 as viewed in a direction perpendicular to the direction of extension of the pathway F1. With the laser-beam image I thus positioned, when the forklift 10 is driven according to the guidance of the laser-beam image I, to pass through the label reading area A, appropriate spacing is provided between the labels L, L, ... attached to the side faces of the respective parts boxes 2, 2, ... and the corresponding cameras 35, 35, ..., 36, 36, .... Suppose the forklift 10 passes through the middle of the traveling pathway F1 as viewed in the width direction, such that the side faces of the parts boxes 2 pass between the position L2 and the position L3 in FIG. 2, in a condition where the cameras 35 are focused on a point between the position L2 and the position L3. In this case, if the side faces of the parts boxes 2 are located on the right-hand side (closer to the cameras 35) of the position L2 in FIG. 2, the positions of the labels L may not be covered by the imaging ranges of the corresponding cameras 35, 35, ..., or the cameras 35 may not be focused on. As a result, the images of the labels L may not be accurately captured. Also, if the side faces of the parts boxes 2 are located on the left-hand side (remote from the cameras 35) of the position L3 in FIG. 2, the cameras 35 may not be focused on, and the images of the labels L may not be accurately captured. In order to avoid these situations, the center position of the first straight-line image I1 of the laser-beam image I needs to substantially match the center position of the traveling pathway F1 as viewed in the direction perpendicular to the direction of extension of the pathway F1, so as to provide appropriate spacing between the labels L, L, ... attached to the side faces of the respective parts boxes 2, 2, and the corresponding cameras 35, 35, ..., 36, 36, .... Namely, the laser-beam image I needs to be moved along a region F3 defined by two-dot chain lines in FIG. 1 (i.e., a widthwise middle region of the traveling pathway F1 indicated by the one-dot chain lines).

As shown in FIG. 3, a coordinate system where "O" denotes the origin as a point on the floor F2, of a straight line (broken line) L4 that extends vertically downward from the laser radiating unit 42, and the x-axis denotes a direction parallel to the direction in which the traveling pathway F1 extends, while the y-axis denotes a horizontal direction perpendicular to the direction of extension of the traveling pathway F1 will be considered. In this case, the following equations (1), (2) are satisfied, where "h" denotes the length of the straight line L4 (the height at which the laser radiating unit 42 is installed), "β" denotes an angle formed by the straight line L4, and a straight line L5 that connects the laser radiating unit 42 with the center position of the first straight-line image I1, "α" denotes an angle formed by the x-axis, and a straight line (broken line) L6 that connects the origin O with the center position of the first straight-line image I1, "X" denotes a coordinate point on the x-axis at the center position of the first straight-line image I1, and "Y" denotes a coordinate point on the y-axis at the center position of the first straight-line image I1.

$$X = h \cdot \cos \alpha \cdot \tan \beta \quad (1)$$

$$Y = h \cdot \sin \alpha \cdot \tan \beta \quad (2)$$

Namely, each of the angles α, β is set so that the coordinate point Y matches the center position of the traveling pathway F1 in the direction perpendicular to the direction of extension of the pathway F1, whereby the center position of the first straight-line image I1 of the laser-beam image I matches the center position of the traveling pathway F1 in the direction perpendicular to the direction of extension of the pathway F1, and the laser-beam image I is centrally positioned in the width direction of the traveling pathway F1. Namely, each of the angles α, β is set by controlling the rotation angles of the vertical-axis rotating unit 43a and horizontal-axis rotating unit 43b, so that the laser-beam image I is centrally positioned in the width direction of the traveling pathway F1.

The laser-beam image I can be moved on the floor of the traveling pathway F1, by changing the rotation angles of the vertical-axis rotating unit 43a and horizontal-axis rotating unit 43b so as to move the coordinate point X. In this embodiment, the laser-beam image I is moved, so as to guide the forklift 10 during traveling, and lead the forklift 10 toward the label reading area A. Namely, while the laser-beam image I is kept in a condition where it is centrally positioned in the width direction of the traveling pathway F1, the laser-beam image I is moved at a predetermined speed toward the label reading area A, so that the forklift 10 is led toward the label reading area A. The moving speed of the laser-beam image I is set to a speed that enables the cameras 35, 35, ..., 36, 36, ... of the imaging units 31, 32 to read the labels L, L, ... when the forklift 10 travels, following the moving image I of laser beam. Namely, a limit value (maximum speed) of the traveling speed of the forklift 10, which enables the cameras 35, 35, . . . , 36, 36, . . . to read the labels L, L, . . . , is measured in advance, and the laser-beam image I is moved toward the label reading area A, at a predetermined speed equal to or lower than the maximum speed. Namely, the rotation angles of the vertical-axis rotating unit 43a and horizontal-axis rotating unit 43b are controlled, so as to move the laser-beam image I at the predetermined speed. The moving speed of the laser-beam image I is preferably set to be as high as possible, within a range in which sufficient reliability in reading of the labels L, L, . . . is ensured.

The controller 44 is configured to transmit command signals to the laser radiating unit 42 and the laser directing unit 43, and control start and stop of radiation of laser beam by the laser radiating unit 42, and traveling of the laser beam by the laser directing unit 43. Although not illustrated in the drawings, the controller 44 includes a central processing unit (CPU), read-only memory (RAM), random access memory (ROM), etc. which are generally known in the art.

The ROM stores control programs, etc. for controlling start and stop of radiation of the laser beam by the laser radiating unit 42, and traveling of the laser beam directed by the laser directing unit 43 (specifically, the position of the laser-beam image I and the movement speed at which the laser-beam image I is moved toward the label reading area A). The CPU performs computations based on the control programs stored in the ROM. The RAM is a memory that temporarily stores computation results, etc. obtained in the CPU.

The guide control device 5 is connected to the first passage sensor 61, the second passage sensor 62, and the controller 44 of the guide device 4, and transmits operational command signals to the controller 44 and the respective imaging units 31, 32, according to outputs from the first passage sensor 61 and second passage sensor 62. The guide control device 5 also includes known CPU, ROM, RAM, etc.

The first passage sensor 61 is installed upstream (in the traveling direction of the forklift 10 on the traveling pathway F1) of the installation position of the imaging device 3 by a given distance, and is operable to detect passage of the forklift 10 on the traveling pathway F1. The first passage sensor 61 includes a light emitter/receiver 61a that faces the traveling pathway F1 and serves to optically detect passage of the forklift 10. The first passage sensor 61 detects passage of the forklift 10, by detecting light reflected by a reflector provided on the forklift 10. The first passage sensor 61 transmits a passage detection signal to the guide control device 5, when it detects passage of the forklift 10.

The second passage sensor 62 is installed upstream (in the traveling direction of the forklift 10 on the traveling pathway F1) of the installation position of the imaging device 3 by a given distance, and downstream (in the traveling direction of the forklift 10 on the traveling pathway F1) of the installation position of the first passage sensor 61 by a given distance. The second passage sensor 62 is operable to detect passage of the forklift 10 on the traveling pathway F1, after it passes the installation position of the first passage sensor 61. The second passage sensor 62 also includes a light emitter/receiver 62a that faces the traveling pathway F1 and serves to optically detect passage of the forklift 10. The second passage sensor 62 detects passage of the forklift 10, by detecting light reflected by a reflector provided on the forklift 10. The second passage sensor 62 transmits a passage detection signal to the guide control device 5, when it detects passage of the forklift 10.

The information processing terminal 7 receives information of an image transmitted from each camera 35, 35, . . . , 36, 36, . . . of the imaging device 3, and obtains information of a QR code in the image. Then, the information processing terminal 7 reads the type, number, etc. of parts contained in each parts box 2, 2, . . . , from the information of the QR code, thereby to determine whether the parts have been properly delivered. Namely, the information processing terminal 7 stores information on orders for parts in advance, and matches information on the delivered parts boxes 2, 2, . . . obtained from the information of the QR codes, against the order information, so as to determine whether the parts have been properly delivered.

The monitor device 8 receives output from the information processing terminal 7, and displays the output result on a screen. When the information processing terminal 7 determines that the parts have been properly delivered, for example, "OK" is displayed. When the information processing terminal 7 determines that the parts have not been properly delivered, "NG" is displayed. Also, detailed information on an excessive or deficient number of parts may be displayed along with the "NG" display. The display on the monitor device 8 is checked by the operator.

Label Reading Operation

Next, label reading operation performed by the label reading system 1 configured as described above will be described.

As shown in FIG. 1, the operator drives the forklift 10, so that the forklift 10 travels toward the traveling pathway F1, in a condition where the skids S, S are placed on and conveyed by the forklift 10. In this embodiment, the forklift 10 moves backward on the traveling pathway F1, so that that the skids S, S are fed toward the label reading area A.

Then, when the forklift 10 passes the installation position of the first passage sensor 61 on the traveling pathway F1, the first passage sensor 61 detects passage of the forklift 10, and sends a passage detection signal to the guide control device 5.

The guide control device 5 that has received the passage detection signal sends an operational command signal to the controller 44 of the guide device 4. The guide device 4 that has received the operational command signal causes the laser radiating unit 42 to radiate a laser beam toward the floor of the traveling pathway F1, so that an image I of laser beam having a given shape is drawn on the floor. Then, the guide device 4 manipulates the laser beam radiated from the laser radiating unit 42, so as to change the radiation direction of the laser beam. More specifically, the guide device 4 moves the laser-beam image I drawn on the floor of the traveling pathway F1, toward the label reading area A, along a middle region (inside the region F3 defined by the two-dot chain lines in FIG. 1) of the traveling pathway F1.

Figure 5:
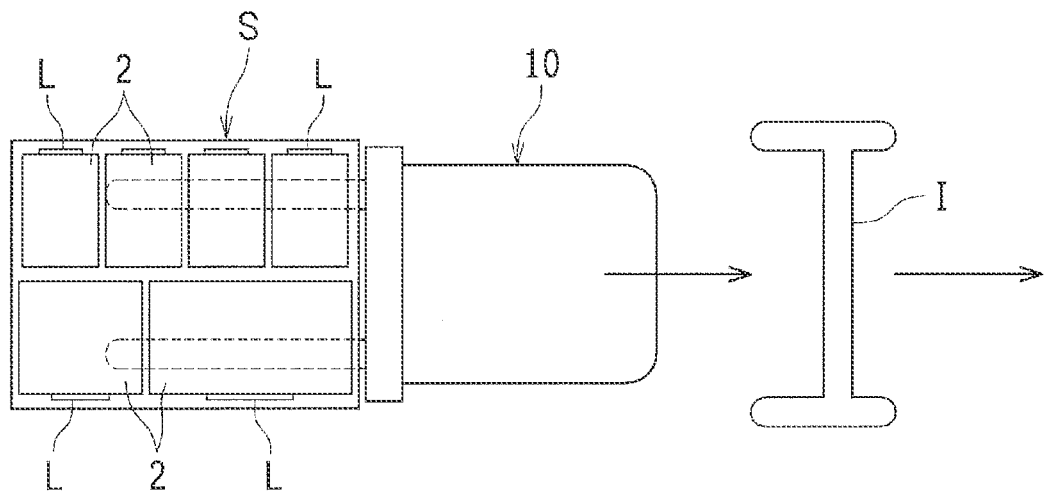
FIG. 5 is a plan view showing a condition in which an image of the laser beam is guiding a forklift, in the first embodiment.

As described above, the laser-beam image I is centrally positioned in the width direction of the traveling pathway F1, and is moved toward the label reading area A at the predetermined speed. The moving speed is set to a speed that enables the cameras 35, 35, . . . , 36, 36, . . . of the imaging units 31, 32 to read the labels L, L, . . . when the forklift 10 travels, following the moving image I of laser beam. FIG. 5 is a plan view showing a condition in which the laser-beam image I is guiding the forklift 10.

Then, when the forklift 10 passes the installation position of the second passage sensor 62 on the traveling pathway F1 (more specifically, in the region F3), the second passage sensor 62 detects passage of the forklift 10, and sends a passage detection signal to the guide control device 5.

The guide control device 5 that has received the passage detection signal sends an operational command signal to the imaging device 3. The imaging device 3 that has received the operational command signal starts taking images, using the cameras 35, 35, . . . , 36, 36, . . . mounted on the respective imaging units 31, 32.

Figure 6:
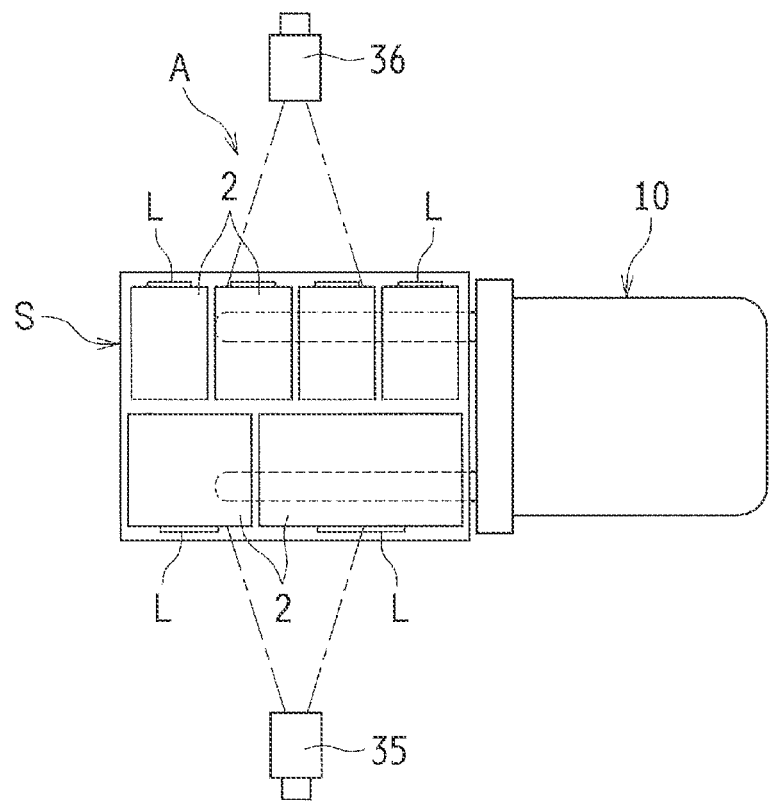
FIG. 6 is a plan view showing a condition in which the forklift is passing through a label reading area, in the first embodiment.

As described above, the moving speed of the laser-beam image I is set to a speed that enables the cameras 35, 35, . . . , 36, 36, . . . of the imaging units 31, 32 to read the labels L, L, . . . when the forklift 10 travels, following the moving image I of laser beam. Therefore, when the operator of the forklift 10 drives the forklift 10 at the traveling speed and traveling position according to the guidance provided by the laser-beam image I (i.e., drives the forklift 10 so that the forklift 10 travels in the middle region (inside the region F3) of the traveling pathway F1 without overtaking the laser-beam image I, the labels L, L, . . . can be accurately read by the corresponding cameras 35, 35, . . . , 36, 36, . . . in the label reading area A. FIG. 6 is a plan view showing a condition in which the forklift 10 is passing through the label reading area A in this case.

Then, the information of the labels L, L, . . . imaged by the cameras 35, 35, . . . , 36, 36, . . . is transmitted to the information processing terminal 7. The information processing terminal 7 reads information, such as the type, number, etc. of parts contained in each of the parts boxes 2, 2, . . . from the information of the QR code, and determines whether the parts have been properly delivered. The information about the result of the determination is transmitted to the monitor device 8. When the information processing terminal 7 determines that the parts have been properly delivered, it sends an OK signal to the monitor device 8. When the information processing terminal 7 determines that the parts have not been properly delivered, it sends an NG signal to the monitor device 8.

When the monitor device 8 receives the OK signal from the information processing terminal 7, "OK" is displayed on the monitor device 8. When the monitor device 8 receives the NG signal from the information processing terminal 7, "NG" is displayed on the monitor device 8. The operator grasps whether the parts have been properly delivered, based on the display on the monitor device 8.

Effects of the Embodiment

As described above, in this embodiment, when the forklift 10 on which the parts boxes 2, 2, . . . are placed (the skids S, S are placed) is guided toward the label reading area A, the guide device 4 located on ahead of the forklift 10 in the traveling direction guides the forklift 10 toward the label reading area A, while indicating the traveling speed of the forklift 10 and the traveling position of the forklift 10 in the horizontal direction perpendicular to the traveling direction, which are set in advance so as to enable reading of the labels L, L, . . . . Accordingly, the operator of the forklift 10 drives the forklift 10 at the traveling speed and traveling position according to the guidance of the guide device 4 (i.e., guidance using the image I of guide light), so that the information on the labels L, L, . . . can be accurately read from images of the labels taken by the imaging device 3 in the label reading area A. In other words, the operator of the forklift 10 is merely required to drive the forklift 10 according to the guidance of the guide device 4 (i.e., guidance using the image I of guide light) (without being required to have a high skill), so that the information on the labels L, L, . . . can be accurately read from the images of the labels taken by the imaging device 3 in the label reading area A. Thus, the method of taking images of the labels L, L, . . . attached to the respective parts boxes 2, 2, . . . and reading information on the labels L, L, . . . is implemented with enhanced practicality, by causing the forklift 10 on which the parts boxes 2, 2, . . . are placed to pass through the label reading area A.

Also, in this embodiment, a special vehicle is not needed for guiding the forklift 10 (since the forklift 10 is guided using the image I of guide light). It is thus possible to guide the forklift 10 toward the label reading area A at a low cost.

Also, in this embodiment, the guide device 4 is installed downstream of the label reading area A in a direction parallel to the traveling direction of the forklift 10, and is arranged to radiate guide light onto a road surface (traveling pathway F1) upstream of the label reading area A in the direction parallel to the traveling direction of the forklift 10. Thus, the guide light radiated from the guide device 4 toward the traveling pathway F1 is prevented from being blocked by the forklift 10. Namely, it is possible to guide the forklift 10 toward the label reading area A by appropriately radiating the guide light onto the traveling pathway F1, until the forklift 10 passes through the label reading area A. As a result, the information on the labels L, L, . . . can be accurately read from images of the labels taken by the imaging device 3 in the label reading area A.

Also, in this embodiment, the information on the labels L, L, . . . is read while the parts boxes 2, 2, . . . are being moved (conveyed). Thus, it is not necessary to secure a specific place (temporary place) for the parts boxes 2, 2, . . . for the purpose of reading the information on the labels L, L, . . . . Thus, working space can be reduced in the production plant.

Second Embodiment

Next, a second embodiment will be described. In this embodiment, a guide carriage that moves along the traveling direction of the forklift 10 is used for guiding the forklift 10 toward the label reading area A. Namely, the guide carriage is provided in place of the guide device 4 in the first embodiment. The other configuration and operation are similar to those of the first embodiment, and thus the guide carriage will be mainly described below.

Figure 7:
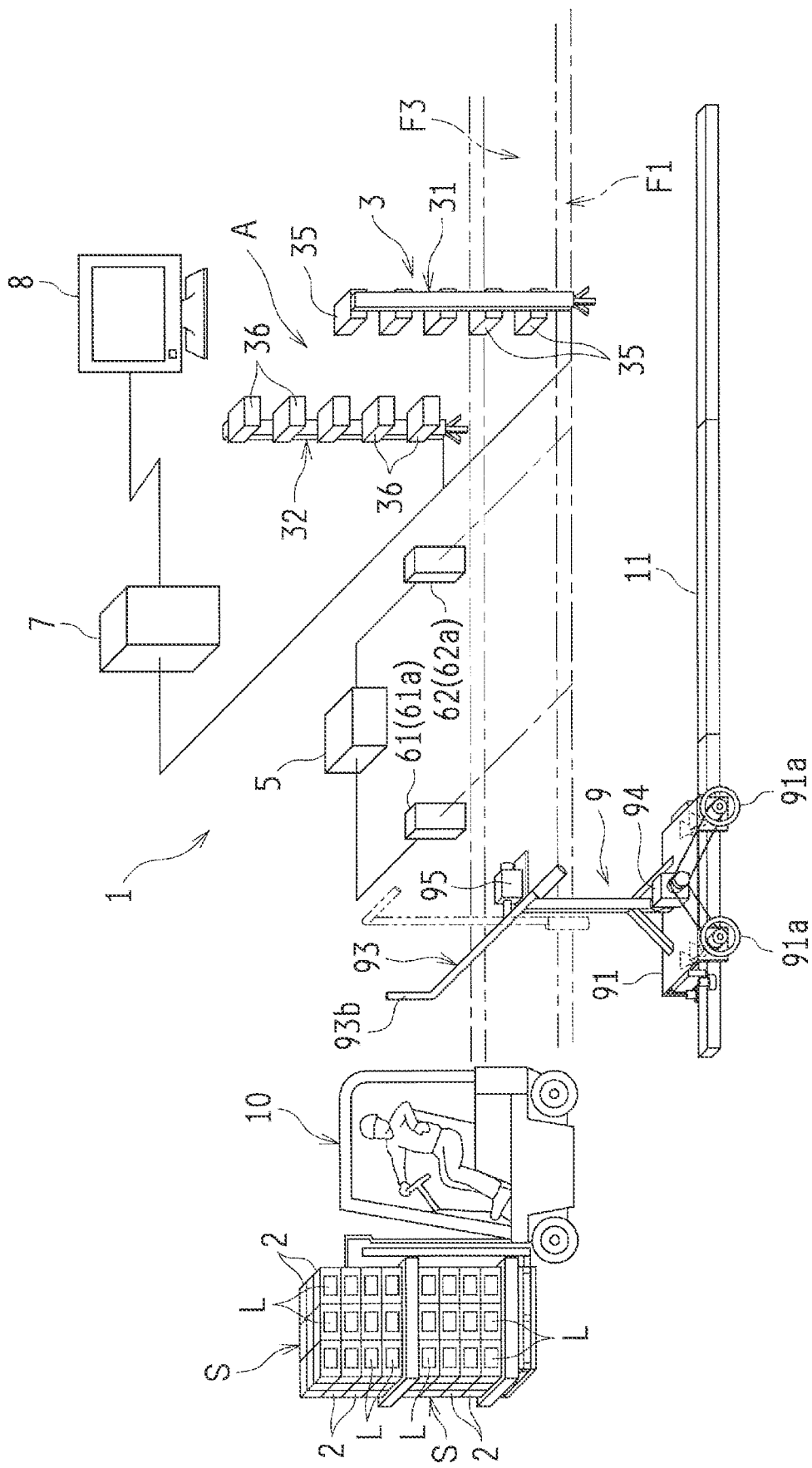
FIG. 7 is a view showing the general configuration of a label reading system according to a second embodiment.
Figure 8:
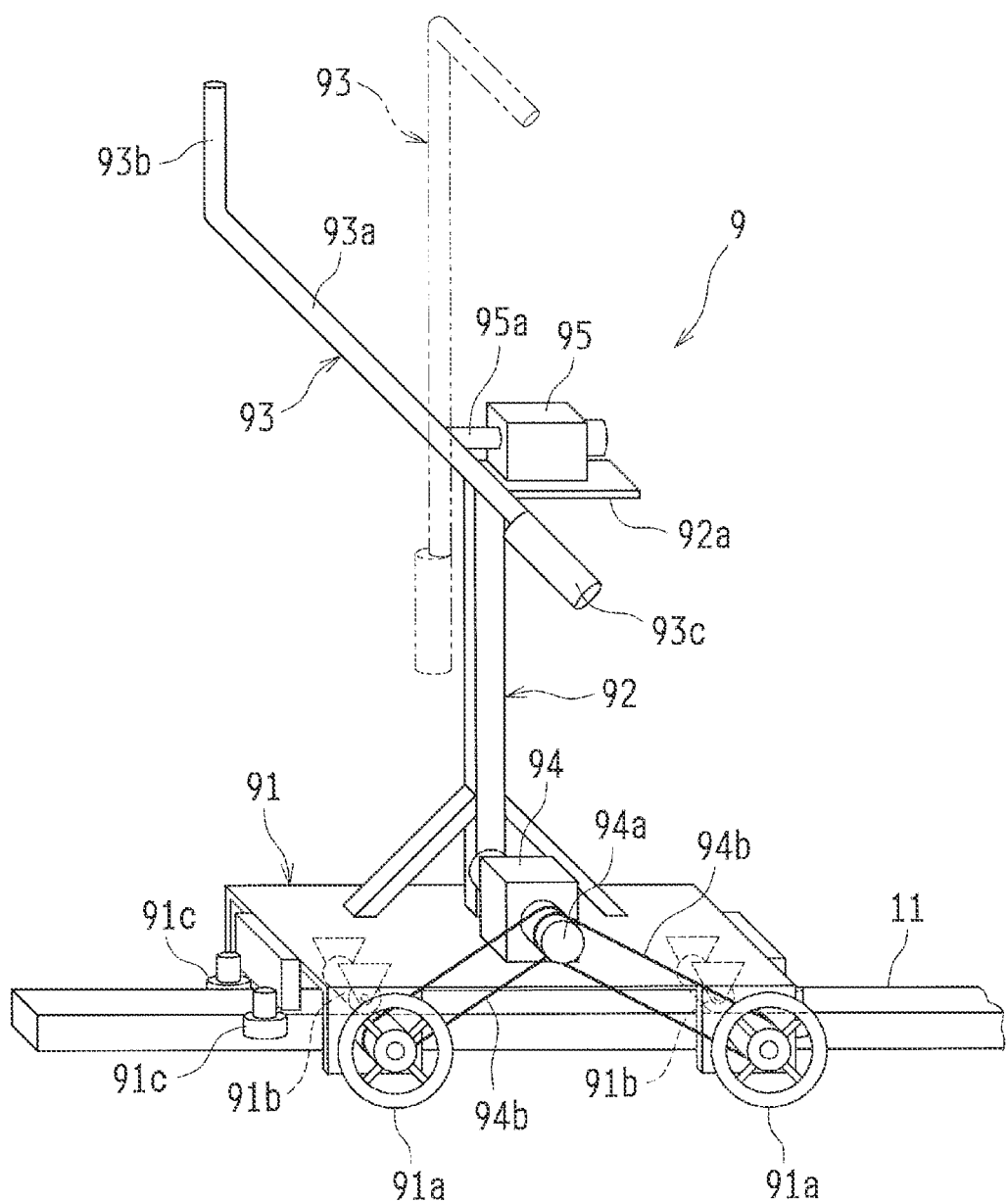
FIG. 8 is a perspective view illustrating a guide carriage in the second embodiment.

FIG. 7 shows the general configuration of the label reading system 1 according to the second embodiment. FIG. 8 is a perspective view illustrating a guide carriage 9 in this embodiment.

As shown in FIG. 7 and FIG. 8, in the label reading system 1 according to this embodiment, a guide rail 11 is laid, along with the traveling pathway F1 of the forklift 10, and the guide carriage 9 is operable to guide the forklift 10 toward the label reading area A, while traveling on the guide rail 11.

As shown in FIG. 8, the guide carriage 9 includes a platform 91 having wheels 91*a*, 91*a*, . . . for traveling, a support post 92 erected on the platform 91, and a guide pole 93 that is swingably supported by the support post 92 (i.e., supported by a motor 95 for swinging, which is mounted on the support post 92, as will be described later).

A pair of first auxiliary rollers 91*b* is provided below the platform 91, such that the rollers 91*b* are mounted on the upper surface of the guide rail 11, and are supported rotatably about the horizontal axes so as to roll on the upper surface. Also, a pair of second auxiliary rollers 91*c* is provided on the front side and back side of the platform 91, such that the rollers 91*c* sandwich the guide rail 11 from the opposite sides in the width direction, and are supported rotatably about the vertical axes. With the auxiliary rollers 91b, 91c thus provided, the guide carriage 9 is arranged to move along the guide rail 11.

A motor 94 for traveling, which can rotate about the horizontal axis, is attached to a lower end portion of the support post 92, and belts 94b, 94b for transmitting drive power are looped around a drive shaft 94a of the motor 94, and the respective wheels 91a, 91a. With this arrangement, when the motor 94 for traveling is activated, its rotary power is transmitted to the respective wheels 91a, 91a, via the belts 94b, 94b, so that the guide carriage 9 travels (moves) along the guide rail 11. Also, the motor 94 for traveling starts operating in response to a start signal from the guide control device 5, so as to cause the guide carriage 9 to travel along the guide rail 11. The start signal is transmitted and received via wireless communications, for example.

The motor 95 for swinging, which is a power source for swinging the guide pole 93, is mounted on an upper part of the support post 92. The motor 95 for swinging is placed on a support plate 92a attached to the upper part of the support post 92. The guide pole 93 is integrally attached to a distal end of a drive shaft 95a of the motor 95 for swinging. The guide pole 93 includes a rod-like pole body 93a, a guide portion (guide member) 93b adjoining one end of the pole body 93a, and a counterweight 93c adjoining the other end of the pole body 93a. The guide portion 93b extends in a direction perpendicular to a direction in which the pole body 93a extends. Then, the pole body 93a is integrally attached to the distal end of the drive shaft 95a of the motor 95 for swinging.

With the above arrangement, the guide pole 93 is able to swing between a guide position in which the pole body 93a extends in the horizontal direction as indicated by solid lines in FIG. 8, and an upright position in which the pole body 93a extends in the vertical direction as indicated by virtual lines in FIG. 8, according to operation of the motor 95 for swinging. In a condition where the guide pole 93 is placed in the guide position, the guide portion 93b extends in the vertical direction, and the position of the guide portion 93b in this case (the position of the guide portion 93b in a plan view) corresponds to the center of the traveling pathway F1 in the width direction. Namely, when the guide carriage 9 travels along the guide rail 11 in this condition, the guide portion 93b can guide the forklift 10 toward the label reading area A, while being kept at the center position of the traveling pathway F1 in the width direction.

When the motor 95 for swinging receives a swing command signal from the guide control device 5, it swings the guide pole 93 from the guide position to the upright position. At this time, power required for swinging may be small, since the guide pole 93 is provide with the counterweight 93c.

In the label reading operation of this embodiment, the operator drives the forklift 10 so that the forklift 10 travels toward the traveling pathway F1, in a condition where the skids S, S are placed on and conveyed by the forklift 10, as shown in FIG. 7. In this case, the guide pole 93 of the guide carriage 9 is placed in the guide position.

Then, when the forklift 10 passes the installation position of the first passage sensor 61 on the traveling pathway F1, the first passage sensor 61 detects passage of the forklift 10, and sends a passage detection signal to the guide control device 5.

The guide control device 5, which has received the passage detection signal, sends a start signal to the motor 94 for traveling. The motor 94 for traveling, which has received the start signal, starts operating, so that the guide carriage 9 travels along the guide rail 11.

Figure 9:
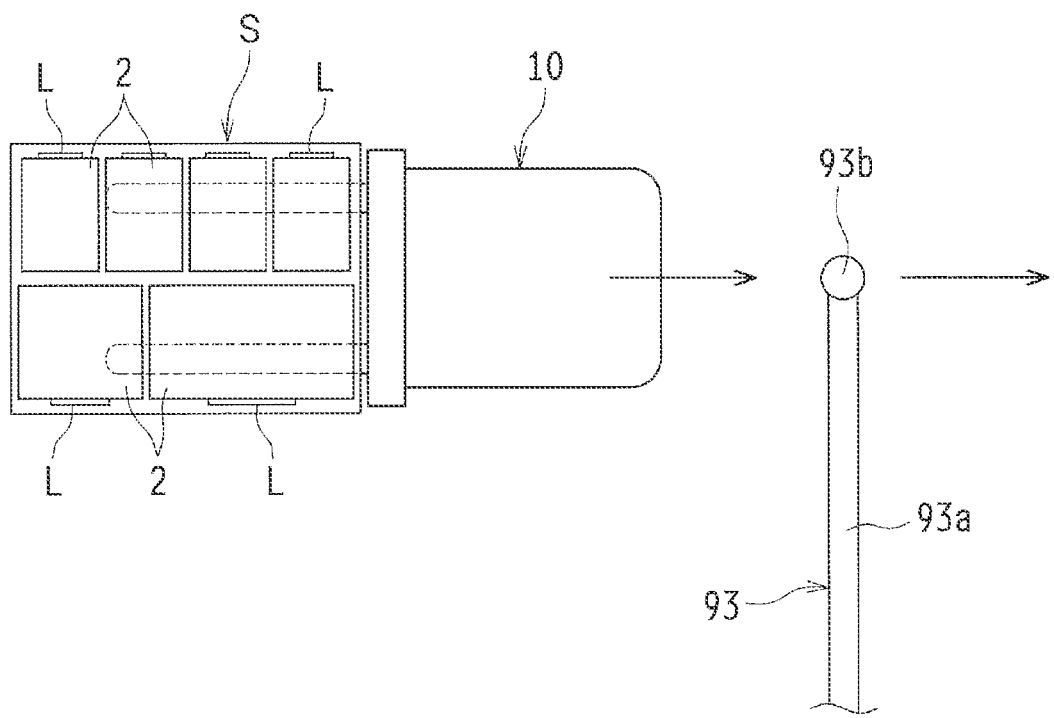
FIG. 9 is a plan view showing a condition in which a guide pole of the guide carriage is guiding a forklift, in the second embodiment.

As described above, in the condition where the guide pole 93 is placed in the guide position, the position of the guide portion 93b corresponds to the center of the traveling pathway F1 in the width direction, and the guide carriage 9 travels at a predetermined speed. The moving speed of the guide carriage 9 is set to a speed that enables the cameras 35, 35, . . . , 36, 36, . . . of the imaging units 31, 32 to read the labels L, L, . . . when the forklift 10 travels, following the guide portion 93b that moves along with the guide carriage 9. FIG. 9 is a plan view showing a condition in which the guide pole 93 (more specifically, the guide portion 93b) of the guide carriage 9 is guiding the forklift 10 in this case.

Then, when the forklift 10 passes the installation position of the second passage sensor 62 on the traveling pathway F1 (more specifically, the region F3), the second passage sensor 62 detects passage of the forklift 10, and sends a passage detection signal to the guide control device 5.

The guide control device 5, which has received the passage detection signal, sends a swing command signal to the motor 95 of the guide carriage 9. The motor 95 for swinging, which has received the swing command signal, starts operating, so as to swing the guide pole 93 from the guide position to the upright position. In this manner, the guide carriage 9 passes one side (the front side in FIG. 7) of the first imaging unit 31, without allowing the guide pole 93 to interfere with the first imaging unit 31.

As in the case of the first embodiment, once the second passage sensor 62 detects passage of the forklift 10, the cameras 35, 35, . . . , 36, 36, . . . mounted on the imaging units 31, 32 start taking images.

The other aspects of the operation are similar to those of the first embodiment.

According to the second embodiment, when the forklift 10 on which the parts boxes 2, 2, . . . are placed (on which the skids S, S are placed) is guided toward the label reading area A, the guide carriage 9 travels such that the guide portion 93b of the guide pole 93 moves toward the label reading area A at a preset speed and a preset position. The speed and position of the guide portion 93b are set in advance so that the information on the labels L, L, . . . can be read from images of the labels taken by the imaging device 3 in the label reading area A when the forklift 10 travels, following the guide portion 93b. Therefore, if the operator drives the forklift 10 so that it follows the guide portion 93b, the information on the labels L, L, . . . can be accurately read from images of the labels taken by the imaging device 3 in the label reading area A. Thus, in this embodiment, too, the method of taking images of the labels L, L, . . . attached to the respective parts boxes 2, 2, . . . and reading information on the labels L, L, . . . is implemented with enhanced practicality, by causing the forklift 10 on which the parts boxes 2, 2, . . . are placed to pass through the label reading area A.

Also, in this embodiment, the operator of the forklift 10 drives the forklift 10 while seeing the guide portion 93b of the guide carriage 9. Namely, the operator drives the forklift 10 while seeing the guide portion 93b located at a certain height from the road surface. Thus, the line of sight of the operator can be kept at a high position, and the operator can properly gain a sense of distance from the guide portion 93b, assuring good operability in operation of the forklift 10.

Other Embodiments

This disclosure is not limited to the illustrated embodiments, but may be embodied with all modifications and applications covered by the appended claims and equivalents thereof.

In the illustrated embodiments, the disclosure is applied to the system of reading the QR codes on the labels L, L, . . . attached to a plurality of parts boxes 2, 2, . . . delivered, in the automobile production plant. However, the disclosure is not limited to this application, but may be applied to label reading systems used in plants other than the automobile production plant. Also, two-dimensional codes on the labels L are not limited to the QR codes, but may be bar codes.

In the illustrated embodiments, the label reading system 1 is arranged to read each of the labels L, L when two parts boxes 2, 2 are arranged and placed in the horizontal direction perpendicular to the traveling direction of the forklift 10. Namely, two imaging units 31, 32 are installed. However, this disclosure is not limited to this arrangement, but may be applied to a label reading system that reads a label when one parts box is placed in the horizontal direction perpendicular to the traveling direction of the forklift 10. In this case, an imaging unit is installed on only one side on which the label is provided.

In the illustrated embodiments, in order to read a label L attached to a side face of each parts box 2, each of the imaging units 31, 32 takes an image of the label L in the horizontal direction. However, this disclosure is not limited to this arrangement, but may include an imaging unit that takes an image of a label attached to the top face of each parts box 2, from above the label, so as to read the label L.

In the illustrated embodiments, the passage sensors 61, 62 respectively include the light emitters/receivers 61a, 62a on one side of the traveling pathway F1. However, this disclosure is not limited to this arrangement, but a light emitter may be located on one side of the traveling pathway F1, and a light receiver may be located on the other side.

In the illustrated embodiments, the labels L are caused to pass through between the position L2 and the position L3 (see FIG. 2). However, the disclosure is not limited to this arrangement, but the labels L may be caused to pass through between the position L1 and the position L2. In this case, a single camera 35 may not be able to take the entire image of the label L (the QR code as a whole), but the label L may be read by synthesizing or combining images taken by two (upper and lower) cameras 35, 35.

This disclosure may be applied to a label reading system for reading labels attached to packages conveyed by a forklift.

What is claimed is:

1. A label reading system that reads a label attached to a surface of at least one package placed on a conveyor vehicle driven by an operator while the conveyor vehicle passes through a label reading area, the surface of the at least one package extending in a direction parallel to a traveling direction of the conveyor vehicle, the label reading system comprising:
   a guide device located ahead of the conveyor vehicle in the traveling direction and configured to guide the conveyor vehicle toward the label reading area, by indicating a traveling speed of the conveyor vehicle, and a traveling position of the conveyor vehicle in a horizontal direction perpendicular to the traveling direction, the traveling speed and the traveling position being set in advance so as to enable reading of the label; and
   an information reading device configured to take an image of the label in a direction perpendicular to the traveling direction of the conveyor vehicle in the label reading area, and read information on the label.

2. The label reading system according to claim 1, wherein:
   the guide device is configured to radiate guide light onto a road surface ahead of the conveyor vehicle in the traveling direction; and
   the guide device is configured to move a radiation position of the guide light on the road surface toward the label reading area at a preset speed and a preset position, so as to enable the information reading device to read the label when the conveyor vehicle travels, following the guide light.

3. The label reading system according to claim 2, wherein an image of the guide light radiated onto the road surface has a shape that extends between a first end position and a second end position of a traveling range of the conveyor vehicle in the horizontal direction perpendicular to the traveling direction of the conveyor vehicle, so as to define the traveling range that enables reading of the label.

4. The label reading system according to claim 2, wherein the guide device is installed downstream of the label reading area in a direction parallel to the traveling direction of the conveyor vehicle, and is configured to radiate the guide light onto the road surface located upstream of the label reading area in the direction parallel to the traveling direction of the conveyor vehicle.

5. The label reading system according to claim 1, wherein:
   the guide device comprises a guide carriage having a guide member that is located at a predetermined height ahead of the conveyor vehicle in the traveling direction; and
   the guide carriage is configured to travel such that the guide member moves toward the label reading area at a preset speed and a preset position, so as to enable the information reading device to read the label when the conveyor vehicle travels, following the guide member.

6. The label reading system according to claim 1, wherein:
   the at least one package comprises two packages arranged in the horizontal direction perpendicular to the traveling direction of the conveyor vehicle and placed on the conveyor vehicle; and wherein:
   the label is attached to a vertical face of each of the packages which extends in the direction parallel to the traveling direction of the conveyor vehicle, on an outer side as viewed in the horizontal direction perpendicular to the traveling direction; and
   the information reading device comprises a plurality of imaging units configured to take images of the labels attached to the packages, from opposite sides in the horizontal direction perpendicular to the traveling direction.

7. The label reading system according to claim 2, wherein the guide device comprises a laser radiating unit and a laser directing unit.

8. The label reading system according to claim 7, wherein the guide device further comprises a controller, and wherein the laser radiating unit comprises a laser oscillator for radiating a laser beam to draw the guide light onto the road surface ahead of the conveyor vehicle in the traveling direction.

9. The label reading system according to claim 8, wherein a length of the guide light measured in the direction perpendicular to the traveling direction is substantially equal to a width of the conveyor vehicle.

10. The label reading system according to claim 9, wherein the guide light is a generally H-shaped image.

11. The label reading system according to claim 1, wherein the conveyor vehicle comprises a forklift.

12. The label reading system according to claim 8, wherein the laser directing unit is operable to continuously change a direction of the laser beam from the laser radiating unit so as to scan the road surface ahead of the conveyor vehicle in the traveling direction with the laser beam.

13. The label reading system according to claim 12, wherein the laser directing unit comprises a vertical-axis rotating unit for rotating the laser radiating unit about the vertical axis, and a horizontal-axis rotating unit for rotating the laser radiating unit about the horizontal axis, and wherein the controller is operable for controlling rotation angles of the vertical-axis rotating unit and the horizontal-axis rotating unit so as to move the laser-beam on the road surface at the traveling speed.

\* \* \* \* \*